Sept. 14, 1965
R. W. HINRICHS
3,205,517
TOOL FOR CLEARING CORN HARVESTERS
Filed Nov. 13, 1963
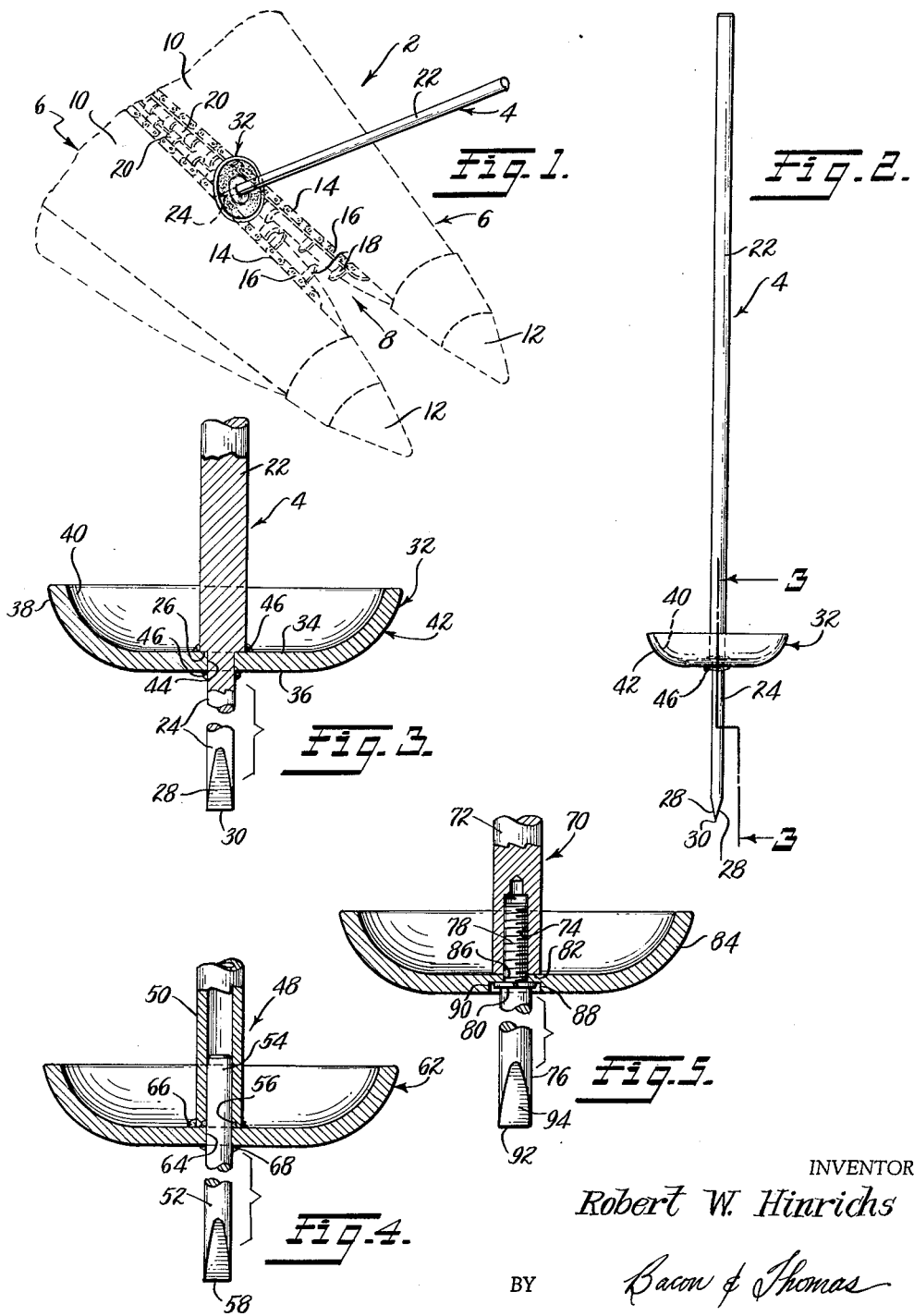
INVENTOR
Robert W. Hinrichs
BY Bacon & Thomas
ATTORNEYS

United States Patent Office 3,205,517
Patented Sept. 14, 1965

3,205,517
TOOL FOR CLEARING CORN HARVESTERS
Robert W. Hinrichs, 120 W. Polk St., Cuba, Ill.
Filed Nov. 13, 1963, Ser. No. 323,521
8 Claims. (Cl. 15—104)

This invention relates generally to tools for use in clearing debris from agriculture harvesting machinery, and more particularly to a tool for use in safely clearing debris from the crop gathering apparatus of a mechanical corn harvesting machine.

Mechanical corn harvesting machines, or corn pickers, are in wide-spread use for harvesting the ears from standing rows of corn plants. Commercially available corn pickers vary in construction, but generally include similar apparatus for gathering the crop into the picking machinery.

Typically, a separate crop gathering apparatus is provided for each row of the standing corn crop, and includes a pair of spaced snout members supported on the front of the corn picker, and which are inclined upwardly and rearwardly from the forward tips thereof. The snout members define a narrow channel therebetween, and include sheet metal side walls which flare upwardly and outwardly from said channel. Two opposed series of picking, or snapping rollers, are disposed rearwardly of the forward end of the inclined snout members below the lower edges of the flared side walls thereof, and the continuous chains of a pair of confronting gathering chains are disposed on opposite sides of the channel defined by said snout members below the lower edges of said side walls. These chains carry fingerlike lugs thereon for grasping stalks of corn as the harvester moves down a row of standing corn. The walls of the channel between the two snout members in the region of the gathering chains are separated about 5 inches, and the upper edges of the confronting flared side walls above said channel are separated about eight inches. The individual rollers of the two series of picking rollers are mounted in confronting pairs for adjustment toward and away from each other, and the rollers of each pair are typically spaced apart a distance of about one inch, or about the diameter of a corn stalk.

Mechanical corn pickers can be constructed for towing behind a tractor, can be mounted directly on a tractor, or can be of the self-propelled type. In the last instance, the machine is integral with its own chassis, and is equipped with an internal combustion engine which furnishes power to both operate the machinery and move the harvester through the field. Corn pickers are available for both one-row and two-row operation, and in the latter case are equipped with two crop gathering mechanisms.

In use, the crop gathering and other mechanical components of a corn picker are supplied with power, either through a power take-off from the engine of a tractor utilized for towing it or upon which it is mounted, or from the internal combustion engine of a self-propelled model. When supplied with power, the confronting picking rollers of each pair rotate toward each other, as viewed from the top of the machine, and the confronting portions of the continuous loop gathering chains move in unison up the channel toward the picking rollers. With the mechanism of the corn picker in motion, the machine is then driven through the field down the rows of corn, so that the corn plants will progressively enter the channel defined between the snout members. The mechanism of a corn picker must be supplied with considerable power for its operation, and typically the confronting portions of the gathering chains will move up the inclined channel at the rate of about 11 ft. per second.

Corn plants are gathered by the gathering chains as the machine moves through the field, the fingerlike lugs on said chains engaging the corn stalks and moving them into the channel toward the picking rollers. The stalks are then fed between the oppositely revolving picking rollers, which function to remove the corn ears therefrom. The corn ears are then conveyed rearwardly and upwardly into the other components of the picker, and are eventually delivered to a trailing wagon, or other hauling vehicle.

Frequently, the gathering chain and picking roller mechanisms will become clogged by corn stalk roots, large stalks, weeds, grass or damp organic material, thus preventing the normal feed of corn stalks through the corn picker. The removal of such debris is necessary before harvesting can continue, and its removal constitutes a grave safety hazard. The safest procedure for removing such debris is to first shut down the picker mechanism, so that the gathering chains and other moving components are at a standstill; however, removal of debris when the apparatus is not in motion is frequently very difficult, and hence the tendency is for an operator to remove such debris while the crop gathering apparatus is in motion, which will hereinafter be referred to as power-clearing.

When power-clearing a corn picker, extreme care must be employed if the operator is not to get a hand or arm caught, or otherwise become entangled in the rapidly moving gathering chains and picking rollers. The normal thing for a machine operator to do when clearing debris from the crop-gathering apparatus of a corn picker is to merely grasp a protruding portion of the debris with his hand, after which he attempts to manipulate the debris in such a way as to dislodge and remove it. The greatest danger in power-clearing with this procedure occurs when the debris becomes dislodged; frequently, upon becoming dislodged, the debris will be immediately pulled into the corn picker by the moving gathering chains and picking rollers, and unless an operator is extremely alert and immediately releases his grasp on the dislodged debris, a great danger exists that his hand and arm will be drawn into the moving apparatus together with the debris, thus causing grave injury. Accidents from this cause occur too frequently in agriculture, especially when a farmer is elderly, fatigued, in a hurry, or is operating under other conditions which reduce his sense of caution and reflexes.

A safer procedure for removing debris while power-clearing is to utilize a simple probe, which typically in the past has assumed the form of a wooden stick, or the like, the probe being utilized to pry the debris from its lodged position. While the use of such a simple probe offers more safety than the hand-grasping procedure outlined in the preceding paragraph, a danger still exists that the simple probe will be pulled into the machinery, carrying the machine operator with it. The dangers associated with both a hand-grasping procedure and the use of a simple probe are aggravated when a corn picker is operated at night, and in cold weather when an additional hazard is created by gloves and other articles of protective wearing apparel that can accidently be caught in the moving machinery.

It is thus apparent that a great need exists for a satisfactory device for use in clearing debris from corn harvesting apparatus, and especially for a device that is safe for use while power-clearing. The tool of the invention is constructed to satisfy this need.

The instant clearing tool includes an elongated handle terminating at its lower end in a probe, said probe being dimensioned to be received between the confronting gathering chains and picking rollers of the crop gathering mechanism, and terminating at its lower end in a chisel-like edge for cutting clogging debris. A guard is fixed on the tool at the juncture of the handle and the probe, and is proportioned and shaped to cooperate with the flared side walls of the snouts to insure safety to an operator utilizing the tool for clearing debris from a moving corn gathering mechanism.

The guard on the tool is circular, and has generally convex and concave lower and upper surfaces, respectively. The diameter of the guard is greater than the distance measured between the lower edges of the flared side walls of the snout members, but is less than the distance between the top edges of said side walls. Thus, the tool can be inserted between the two snout members only to a predetermined maximum depth, at which depth the convex edges of the guard will be lodged against the confronting flared snout side walls. The probe is of a diameter less than the space between the gathering chains and has a length sufficient so that it can be manipulated to effectively cut and/or poke out debris from between either the gathering chains or the picking rollers, even though the maximum insertion depth of the tool is limited by the guard contacting the snout side walls. A tool is thus provided which cannot be drawn into the moving, gathering chains and picking rollers because of the limited maximum insertion depth provided by the cooperating guard and side walls, and which can be readily manipulated to clear clogging debris.

The convex lower surface of the guard offers no protusions or edges which might damage the sheet metal of the snout side walls, or which might catch on debris or elements of the moving machinery. The concave upper surface of the guard provides a cup-like enclosure, which will protect a hand should it be gripping the tool too near the juncture of the handle and the probe, and thus function to prevent either the hand or the wearing apparel of the operator from becoming caught in the machinery. While the invention is herein described with particular reference to mechanical corn pickers, it can also be utilized with other harvesting machines employing similar crop gathering apparatus, and for other like uses.

It is an object of the present invention to provide a tool for use in safely clearing debris from the crop gathering apparatus of a harvesting machine.

Another and specific object is to provide a tool for use in safely power-clearing the crop gathering mechanism of a corn picking machine.

A futher object is to provide a mechanical corn picker clearing tool constructed to protect an operator, and which tool cannot be drawn into the moving machinery.

It is also an object to provide a clearing tool that can be easily fabricated and economically constructed.

Other objects and many of the attendant advantages of the present invention will be readily understood from the following detailed description, when considered in connection with the accompanying drawings, wherein:

FIG. 1 is a fragmentary, perspective view, showing the crop gathering snout members of a mechanical corn picker in dotted lines, and a first embodiment of the clearing tool in full lines in its operable position;

FIG. 2 is an enlarged elevational view of the clearing tool of FIG. 1;

FIG. 3 is an enlarged, fragmentary, vertical sectional view, taken along the line 3—3 of FIG. 2, showing the construction of the probe, the handle, and the guard of the tool of FIG. 2;

FIG. 4 is a view similar to FIG. 3, but showing a second embodiment of the invention, and FIG. 5 is a view similar to FIG. 3, but showing a third embodiment of the invention, wherein the elements of the tool are detachably secured together.

Referring now to the drawings, the front portion of a mechanical corn picker crop gathering apparatus is shown in dotted lines at 2 in FIG. 1, a first embodiment of the clearing tool being shown in operative relationship therewith at 4. The apparatus 2 comprises a pair of spaced snout members 6, which define a channel 8 therebetween for receiving corn plants. The snouts 6 are mounted on the forward end of a mechanical corn picker (not shown), and include upwardly and outwardly flared, confronting side walls 10, constructed of sheet metal supported by a suitable framework. The snout members 6 terminates at their lower, front ends in pointed feet 12, and the separation between the lower edges 14 of the side walls 10 measured across the channel 8 will typically be about 5 inches; the side walls 10, as has been mentioned, flare upwardly and outwardly, and are separated near the upper confronting ends thereof by about 8 inches.

Mounted on the snouts 6 below the lower edges 14 of the confronting side walls 10 are confronting, endless gathering chains 16, which are suitably connected with the power-driven mechanism of the corn picker so that the confronting, exposed portions thereof will travel in unison longitudinally of the channel 8 upwardly and rearwardly from the feet 12. The gathering chains 16 have fingerlike lugs 18 thereon which, as will be readily appreciated, engage the stalk of a corn plant entering the channel 8.

Positioned inwardly from the forward ends of the snouts 6, and mounted below the lower edges 14 of the side walls 10, and a pair of confronting, transversely spaced, longitudinally extending picking, or snapping, rollers 20.

The rollers 20 are typically provided with a groove formation for grasping stalks of corn received therebetween, and are connected to the power-driven picker mechanism and arranged to rotate oppositely toward each other, as viewed from the top in FIG. 1. The confronting rollers 20 are mounted so that normally the transverse spacing therebetween is about 1 inch, and function to grasp and pull downwardly a stalk of corn brought therebetween; as the stalk of the corn plant is drawn downwardly through the rollers 20, the corn ears borne on said stalk will be removed therefrom, and will then be transported upwardly and rearwardly of the snout 6 and into the remainder of the picker mechanism.

In operation, the corn picker is supplied with power, and the gathering chains 16 and picking rollers 20 are placed in motion. The machine is then driven down a row of corn plants, with the plants successively entering the channel 8. The corn stalks entering the channel 8 are grasped by the chains 16, and fed thereby to the picking rollers 20.

It will be readily understood that, because of the close spacings between the picking rollers 20 and the gathering chains 16, the apparatus 2 can become clogged if large weeds, wads of vegetable matter, or an entire corn plant, including the root structure, should enter the channel 8. If such clogging occurs, then the channel 8 will be blocked against the entry of corn stalks, and the picking operation must be halted. The gathering chains 16, as has been mentioned earlier, will typically travel at the rate of about 11 ft. per second, and hence great care must be exercised in removing debris from the exposed, moving machinery.

The tool 4 is shown in FIGS. 1–3, and includes a cylindrical handle 22, which will typically be about 3 ft. in length. The handle 22 has a reduced diameter probe 24 formed integrally on the lower end thereof, a radial shoulder 26 being defined between the handle 22 and the probe 24 at the juncture thereof. The probe 24 is cylindrical, and preferably has a diameter of about ⅜ of an inch and no greater than about ¾ of an inch, so that it can easily enter the narrow space between the chains 16 and picking rollers 20. The lower end of the probe 24 terminates in a pair of tapered, oppositely disposed, lateral surfaces 28, which extend over about the lower 1 to 1½ inches of the length of said probe, and define a transversely extending, chisel-like cutting edge 30.

Mounted on the tool 4 at the juncture of the probe 24 and the handle 22 is a circular guard 32, said guard including circular planar surfaces 34 and 36 on the upper and lower surfaces thereof, respectively. The flat circular surfaces 34 and 36 will typically have a diameter of about 3½ inches, and a radially curved rim 38 extends upwardly therefrom having a maximum diameter of about 6 inches. The guard 32 thus has generally concave and convex upper and lower surfaces 40 and 42, respectively, and resembles a hollow hemisphere flattened on its base. The guard 32 is provided with a centrally positioned axial bore 44 for receiving the cylindrical probe 24, and is seated against the radial shoulder 26. The guard 32 is rigidly secured to the handle 22 and the probe 24 by welding as shown at 46.

The dimensions of the guard 32 and the probe 24 must be properly proportioned relative to the dimensions of the crop gathering apparatus 2, if the clearing tool 4 is to possess its intended operational safety characteristics. Specifically, the maximum diameter of the guard 32 should be greater than the distance measured between the lower edges 14 of the confronting side walls 10, but less than the distance measured between the tops of said side walls. Commonly, the confronting lower edges 14 of the side walls 10 of the crop gathering apparatus 2 on a corn picker will be spaced apart a distance of about 5 inches; for such a spacing, the guard 32 should have a maximum diameter of at least about 6 inches.

The probe 24, as has been mentioned, preferably has a diameter of about ⅜ of an inch, whereby it can be easily received between the closely spaced picking rollers 20. The probe 24 must project a sufficient distance below the lower surface 36 of the guard 32 so that it can probe between and around the gathering chains 16 and the rollers 20, for removing debris therefrom. When the tool 4 is utilized with a conventional crop gathering apparatus 2, wherein the channel 8 is about 5 inches in width, and when the guard 32 has a maximum diameter of about 6 inches, it has been found that a probe 24 having a length of about 6 to 8 inches functions properly. The hande 22 is preferably about 30 inches in length and may have a diameter of ¾ of an inch, or greater, so long as it can be firmly gripped by one or both hands of the operator.

While the dimensions for the tool 4 can vary, depending upon the dimensions of the apparatus with which it is to be used, the parameters for determining said dimensions remain the same. First, the maximum diameter of the guard 32 must be greater than the distance measured between the lower edges 14 of the side walls 10, whereby said guard will come to rest upon said side walls to positively limit the maximum depth to which the tool 4 can be inserted therebetween. Secondly, the probe 24 must project downwardly from the lower surface of the guard 32 a distance sufficient so that the tool can be manipulated to cut and/or dislodge debris from the gathering chains 16 and the rollers 20 when said tool is inserted to said maximum depth. The flattened lower surface 36 functions to provide maximum clearance between the guard 32 and the moving mechanism.

A modification of the tool is illustrated at 48 in FIG. 4, and incorporates a tubular handle 50 and a solid, cylindrical probe 52. The upper end 54 of the probe 52 is received within the lower end of the tubular handle 50, which preferably has an internal diameter only slightly greater than the diameter of said probe. The probe 52 is rigidly secured to the handle 50 by a weld 56, and terminates at its lower end in a chisel-like, transversely extending cutting edge 58.

The tool 48 is provided with a guard 62, identical in construction to the guard 32, provided with a centrally positioned axial bore 64 for receiving the probe 52. The guard 62 is seated against the lower end face of the tubular handle 50, and is secured to said handle by a weld 66, and to the probe 52 by a weld 68. The proportions for the probe 52 and the guard 62 correspond to the proportions described above with respect to the tool 4.

The tool 48 offers an advantage over the tool 4, in that the hollow tubular handle 50 results in a significantly lighter weight tool. Further, the probe 52 can be made of a hardened tool steel; whereas the handle 50 can be made from a conventional steel. This results in a more economical construction than is possible in the tool 4, wherein the handle 22 and probe 24 are integrally constructed from the same material.

The elements of the probes 4 and 48 are rigidly connected by welding, whereby the danger of separation thereof during use is eliminated. This feature is important to the safe use of the invention. While the welded constructions of FIGS. 1–4 are preferable in that they provide a probe having rigidly connected elements, in certain instances a tool which can be disassembled when necessary is desirable. The embodiment of FIG. 5 is such a tool, but designed so that the elements thereof can be firmly secured together to prevent inadvertent separation.

Referring to FIG. 5, a tool 70 is shown incorporating a cylindrical handle 72 having a threaded cylindrical bore 74 in the lower end thereof. A probe 76, having a diameter smaller than the diameter of the handle 72, is provided on its upper end with a reduced threaded portion 78 that is receivable within the threaded bore 74. A shoulder 80 separates the lower portion of the probe 76 from the threaded portion 78 thereof, and confronts a shoulder 82 defined by the lower end face of the handle 72.

Mounted on the tool 70 is a guide 84, which is identical to the guards 32 and 62, except that it is provided with a centrally position bore 86 terminating at its lower end in a counterbore 88. The bore 86 is of a size to receive the threaded portion 78 of the probe 76, and a conventional lock washer 90 is disposed between the shoulder 80 and the bottom, radial wall of the counterbore 88. The guard 84 is thus securely clamped between the confronting shoulders 80 and 82 when the probe 76 is fully threaded into the bore 74 in the handle 72, whereby the components of the tool 70 are firmly secured together.

The probe 76, like the probes 24 and 52, terminates at its lower end in a transversely extending, chisel-like cutting edge 92, defined by tapered, oppositely directed lateral surfaces 94. The probe 76 and the guard 84 of the tool 70 are proportioned as described hereinabove with respect to the tool 4, whereby the guard 84 functions to establish a maximum depth to which the tool 70 can be inserted between the snout members 6. It is readily seen that the tools 4, 48 and 70 are all constructed so that they can be safely used by an operator.

In use, the handle of the clearing tool 4, 48 or 70 is grasped by the operator, the guard members 32, 62 or 84 functioning as a shield to protect a hand placed within the upwardly-directed rim thereof for grasping the tool at the junction of said handle and its attached probe. The tools 4, 48 and 70 can then be safely inserted by the operator into the mechanism of the apparatus 2, even while the machinery thereof is in motion, for removing debris therefrom. The guard members 32, 62 and 84 will always engage the confronting side walls of the snout members when their associated probes have been inserted to a maximum depth, such engagement positively limiting the insertion depth and making it impossible for the tools to be drawn into the moving machinery. Thus, the tools 4, 48 and 70 all make possible the clearing of debris from corn pickers and like equipment without any attendant grave dangers to the operator, and thus contribute significantly to increasing the safety of farm operations.

Obviously, many modifications and variations in the design and dimensions of the present invention are possible in the light of the above teachings. It is therefore to be understood that within the scope of the appended claims, the invention may be practiced otherwise than as specifically described.

I claim:

1. A tool for use in cleaning the crop gathering apparatus of a corn harvester, said apparatus including a pair of channel-defining snout members having confronting upwardly and outwardly flared sidewalls, the lower edges of said sidewalls being spaced, and having transversely closely spaced and longitudinally extending gathering chain means and picking roller means mounted therebelow, said tool comprising: an elongated handle; a downwardly-projecting rigid probe on the lower end of said handle, the length of said handle being several times the length of said probe, said probe terminating at its lower end in a transverse cutting edge, and having a diameter less than that of said handle whereby to define a shoulder at the junction of said probe with said handle; a generally hemispherical guard disposed with the rounded exterior thereof facing downwardly and having a centrally disposed bore therethrough of a diameter slightly greater than that of the portion of said probe extending therethrough, said guard being received on said probe portion, and being seated against said shoulder and having a maximum transverse cross-sectional diameter of at least about six inches, and the length of said probe being at least about the same as said maximum transverse cross-sectional diameter of said generally hemispherical guard; and means rigidly securing together said handle, said guard and said probe, the lower end of said probe being insertable and manipulatable between the snout members of said corn harvester for clearing said gathering chain means and said picking roller means of clogging material, and the lower rounded exterior of said guard being engageable with said sidewalls to limit the depth to which said tool can be inserted between said snout members.

2. A tool as recited in claim 1, wherein said guard includes a circular planar surface centrally positioned on the lower, convex face thereof, said probe projecting generally normally from the center of said circular planar surface.

3. A tool as recited in claim 2, wherein the upper surface of said guard is generally concave, whereby said guard has the general configuration of an upwardly facing, hollow hemisphere, flattened exteriorly on its base.

4. A tool as recited in claim 1, wherein the opposite lateral surfaces on the lower end of said probe are tapered to define said transversely extending cutting edge.

5. A tool as recited in claim 1, wherein said handle and said probe are formed integrally, and wherein said guard is rigidly attached by welding to said probe and said handle.

6. A tool as recited in claim 1, wherein the lower end of said handle is tubular, said probe being formed separately from said handle and having its upper end received and rigidly secured within the tubular lower end of said handle.

7. A tool as recited in claim 6, wherein the lower tubular end of said handle is interiorly threaded, and wherein the upper end portion of said probe is of reduced diameter and is threaded for connection with said handle, said threaded end portion extending through said bore in said guard, and there being a shoulder on said probe positioned at the lower end of said threaded end portion to confront said shoulder on said handle and arranged so that when said probe is threadably connected to said handle said guard will be clamped between said confronting shoulders.

8. A tool as recited in claim 6, wherein said handle, said probe, and said guard are rigidly attached by welding to each other.

References Cited by the Examiner

UNITED STATES PATENTS

| | | | |
|---|---|---|---|
| 1,602,891 | 10/26 | Everett | 30—295 |
| 2,412,783 | 12/46 | Rurak | 30—164.5 |
| 2,465,024 | 3/49 | Ludt | 294—19 |

ROBERT W. MICHELL, *Primary Examiner.*

WALTER A. SCHEEL, *Examiner.*